United States Patent
Takaoka et al.

(10) Patent No.: US 9,432,244 B2
(45) Date of Patent: Aug. 30, 2016

(54) MANAGEMENT DEVICE, INFORMATION PROCESSING DEVICE AND CONTROL METHOD THAT USE UPDATED FLAGS TO CONFIGURE NETWORK SWITCHES

(71) Applicant: FUJITSU LIMITED, Kawasaki-shi, Kanagawa (JP)

(72) Inventors: Masanori Takaoka, Kawasaki (JP); Hayato Kubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 13/758,310

(22) Filed: Feb. 4, 2013

(65) Prior Publication Data
US 2013/0151686 A1 Jun. 13, 2013

Related U.S. Application Data

(63) Continuation of application No. PCT/JP2010/063611, filed on Aug. 11, 2010.

(51) Int. Cl.
G06F 15/173 (2006.01)
H04L 12/24 (2006.01)
H04L 12/26 (2006.01)

(52) U.S. Cl.
CPC ........... *H04L 41/00* (2013.01); *H04L 12/2602* (2013.01); *H04L 41/082* (2013.01); *H04L 41/0816* (2013.01)

(58) Field of Classification Search
USPC .......................... 709/223, 224, 203, 219, 248
See application file for complete search history.

(56) References Cited

U.S. PATENT DOCUMENTS 6,330,600 B1 * 12/2001 Matchefts et al. ............ 709/223
6,873,602 B1 * 3/2005 Ambe ............................ 370/254
7,397,768 B1 * 7/2008 Betker ........................... 370/254
7,433,300 B1 * 10/2008 Bennett et al. ................ 370/216
7,904,599 B1 * 3/2011 Bennett ......................... 709/249
2007/0038679 A1 * 2/2007 Ramkumar et al. .......... 707/200
2007/0097917 A1 * 5/2007 Kang ............................. 370/331
2008/0109568 A1 * 5/2008 Rengarajan et al. ........... 710/19
2011/0196958 A1 * 8/2011 Bharadwaj et al. .......... 709/224
2012/0005318 A1 * 1/2012 Beaty et al. .................. 709/221

FOREIGN PATENT DOCUMENTS

| JP | 6-60001 | 3/1994 |
|---|---|---|
| JP | 7-36764 | 2/1995 |
| JP | 11-154110 | 6/1999 |
| JP | 2007-011704 | * 1/2007 |

OTHER PUBLICATIONS

Mechanical Translation of JP 2007-011704.*
International Search Report of Corresponding PCT Application PCT/JP2010/063611 mailed Sep. 7, 2010.
Toshihiro Ozawa et al., "Organic Computing", Jan. 11, 2005, pp. 70-74.

* cited by examiner

*Primary Examiner* — Aftab N Khan
(74) *Attorney, Agent, or Firm* — Staas & Halsey LLP

(57) ABSTRACT

A management device includes: a detection portion that detects change of common information based on an update flag set to a changed part of the common information when the common information set to a plurality of switch devices is changed; and an update portion that updates common information set to another switch device by using information on the changed part to which the update flag is set when the detection portion detects the change of the common information, the information on the changed part being included in one switch device.

9 Claims, 10 Drawing Sheets

PRIOR ART

FIG. 1

CONFIGURATION DEFINITION INFORMATION
1.UNIQUE MANAGEMENT INFORMATION
DEVICE NAME(ex.SW1)
IP ADDRESS(ex. 192.168.1.1/24)
ETC.
2.COMMON MANAGEMENT INFORMATION
VIRTUAL LAN INFORMATION
PASSWORD
SETTING OF EACH INTERFACE
ETC.

US 9,432,244 B2

MANAGEMENT DEVICE, INFORMATION PROCESSING DEVICE AND CONTROL METHOD THAT USE UPDATED FLAGS TO CONFIGURE NETWORK SWITCHES

CROSS-REFERENCE TO RELATED APPLICATIONS

This application is a continuation application of International Application PCT/JP2010/063611 filed on Aug. 11, 2010 and designated the U.S., the entire contents of which are incorporated herein by reference.

FIELD

A certain aspect of the embodiments is related to a management device, an information processing device and a control method.

BACKGROUND

In a blade server, each server blade included in the blade server includes a network interface such as a LAN (Local Area Network) port. Therefore, whenever the change, the extension, or the integration of the server blades is performed, the optimization of network design of the whole blade server is required. The blade server includes a plurality of switch blades that collect data from each server blade via the LAN port, and efficiently transmit and receive data to/from the outside of the blade server, in addition to the server blades.

Each of the switch blades includes unique management information that is unique for each switch blade, and common management information that is common to the switch blades, as configuration definition information, as illustrated in FIG. 1. There are a device name, an IP (Internet Protocol) address and so on, as the unique management information. There are virtual LAN information as mentioned later, a password, setting of each interface mounted on the switch blade and so on, as the common management information.

When the change, the extension, or the integration of the server blades is performed in such a blade server, an administrator changes the configuration definition information such as a configuration file included in each switch blade. When the change of the server blade, such as the upgrade of the server blade, is changed, a process to be performed by the administrator is illustrated in FIGS. 2A and 2B. Here, when the extension or the integration of the server blades is performed alternatively, the administrator performs the process illustrated in FIGS. 2A and 2B.

In FIG. 2A, the administrator first performs communication check, i.e., checks whether a server blade to be changed can communicate (step S1). When there is no communication failure of the server blade to be performed, as a result of the communication check, the administrator shuts down the power supply of the server blade to be changed (step S2). The administrator replaces the server blade to be changed with a new server blade (step S3), and changes the configuration definition information in the configuration file or the like including the unique management information and the common management information included in each switch blade (step S4). Then, the administrator turns on the new server blade (step S5), and checks whether the new server blade can communicate (step S6). The present process is completed. Here, in FIG. 2B, a process of step S4 in FIG. 2A is described in detail. First, the administrator checks the configuration definition information in one switch blade (step S11), and backs up the configuration definition information in a memory (step S12). Then, the administrator changes the configuration definition information (especially, setting of the interface including the LAN port) in the one switch blade (step S13). Similarly, the administrator checks the configuration definition information in another switch blade (step S14), and backs up the configuration definition information in a memory (step S15). Then, the administrator changes the configuration definition information (especially, setting of the interface including the LAN port) in the another switch blade (step S16). Thus, when the change, the extension, or the integration of the server blades is performed, the administrator performs the optimization of the network.

Conventionally, there is known a file environment information managing system that prevents the discordance of common information in file environmental information between machines from occurring and freely changes individual information for each machine (see Japanese Laid-open Patent Publication No. 7-36764). There is conventionally known a system that supplies information to all machines in the system by only defining information to a single machine in a distributed machine environment (see Japanese Laid-open Patent Publication No. 6-60001).

SUMMARY

According to an aspect of the present invention, there is provided a management device including: a detection portion that detects the change of common information based on an update flag set to a changed part of the common information when the common information set to a plurality of switch devices is changed; and an update portion that updates common information set to another switch device by using information on the changed part to which the update flag is set when the detection portion detects the change of the common information, the information on the changed part being included in one switch device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of configuration definition information;

DESCRIPTION OF EMBODIMENTS

A description will be given of embodiments of the invention, with reference to drawings.

Figure 2A:
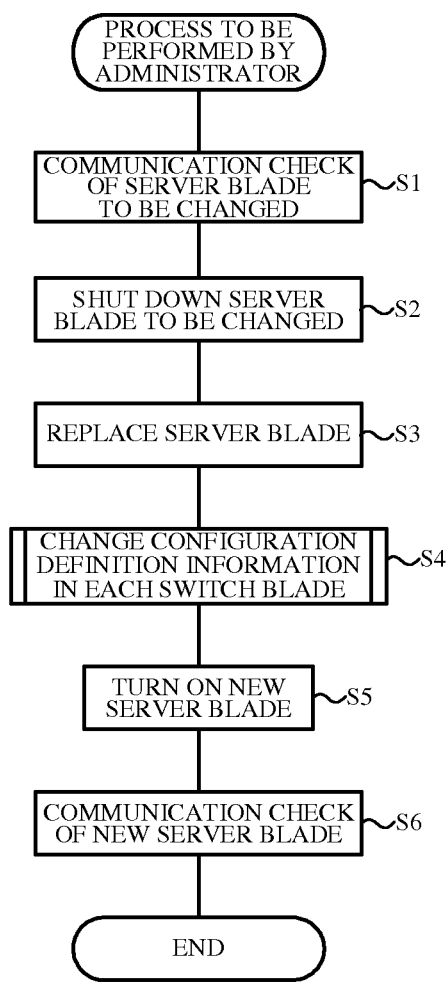
FIGS. 2A and 2B are flowcharts illustrating processes which an administrator performs.
Figure 2B:
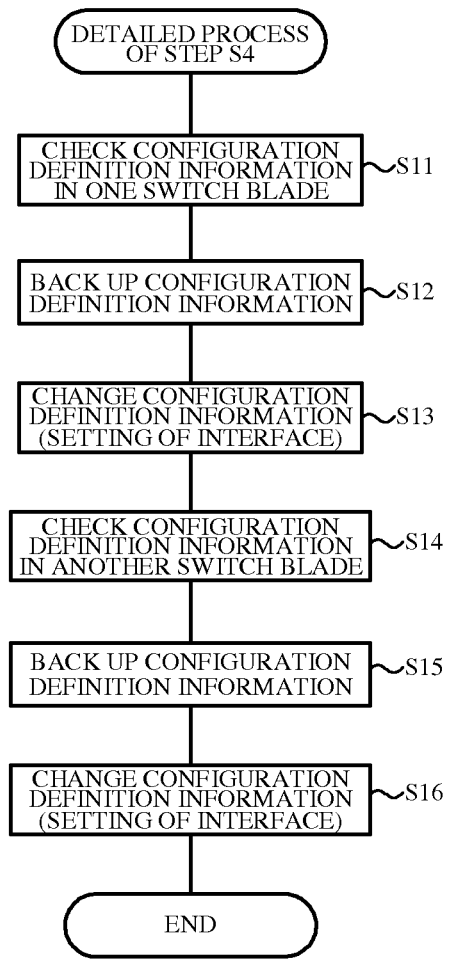
Figure 3:
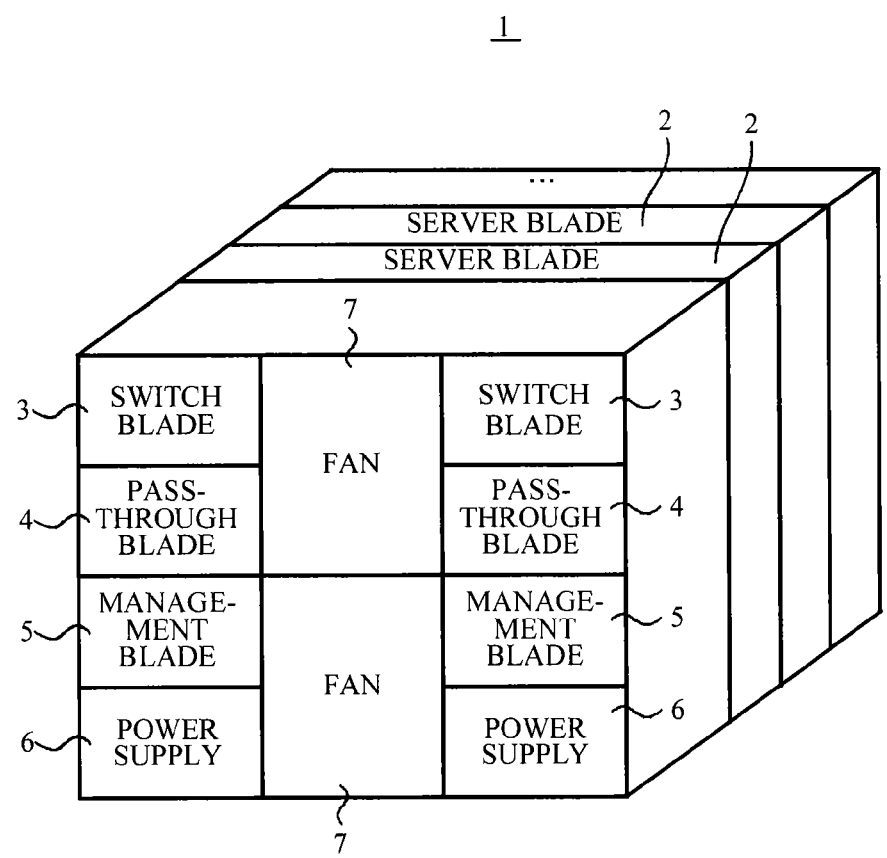
FIG. 3 is a diagram illustrating the schematic configuration of a blade server.

FIG. 3 is a schematic diagram illustrating the schematic configuration of a blade server.

A blade server 1 as an information processing device is equipped with a plurality of server blades 2 (e.g. an information processor), a plurality of switch blades 3 (e.g. a switch device), a plurality of pass-through blades 4, a plurality of management blades 5 (e.g. a management device), a plurality of power supplies 6, and a plurality of fans 7. The respective switch blades 3, the respective pass-through blades 4, the respective management blades 5, the respective power supplies 6, and the respective fans 7 are configured redundantly. This is because one of these elements can be used even if another one of these elements breaks down.

Each server blade 2 is a single unit which has collected the functions of the server, and includes a memory, a hard disk, a processor, an interface, and so on. Each switch blade 3 is a switch that switches a plurality of wirings, such as interfaces between servers which connect between the server blades 2. Each pass-through blade 4 is an interface which connects the blade server 1 with a LAN (Local Area Network). Each management blade 5 turns on and off the power supply 6, manages a temperature, and detects communication failure. Each power supply 6 supplies an electrical power to each element included in the blade server 1. Each fan 7 emits the heat in the blade server 1 outside.

Figure 4A:
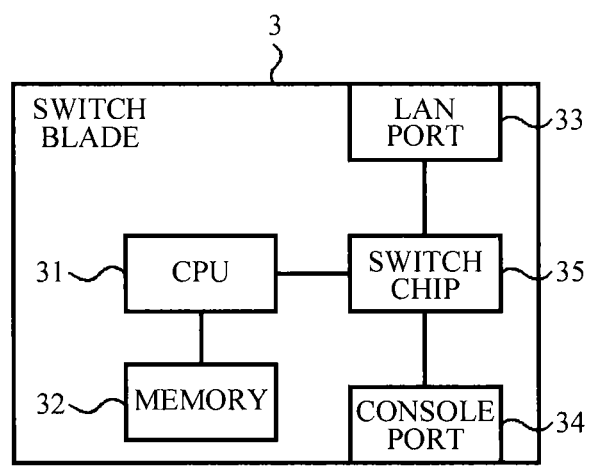
FIG. 4A is a block diagram illustrating the configuration of a switch blade.
Figure 4B:
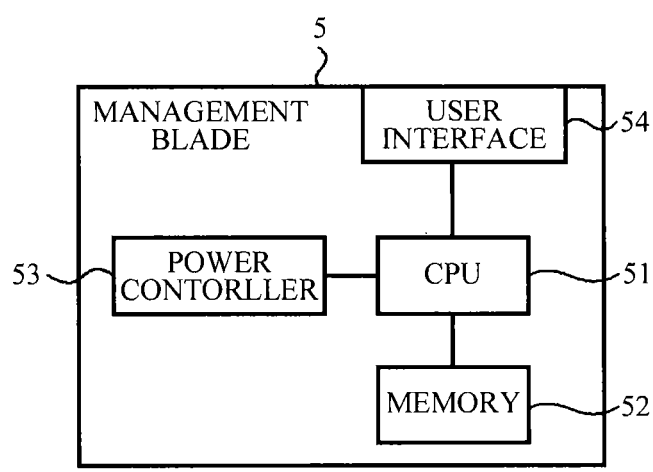
FIG. 4B is a block diagram illustrating the configuration of a management blade.

FIG. 4A is a block diagram illustrating the configuration of the switch blade 3. FIG. 4B is a block diagram illustrating the configuration of the management blade 5.

The switch blade 3 includes: a CPU (Central Processing Unit) 31 (i.e., a setting portion) that controls the whole switch blade; a memory 32 that stores configuration definition information described later and a control program; a LAN port 33 that connects with a user PC (Personal Computer) via a LAN cable; a console port 34 that connects with the server blade 2 via a serial cable; and a switch chip 35 that switches the input and output from the LAN port 33 and the console port 34. The switch blade 3 may include a plurality of LAN ports 33 and a plurality of console ports 34.

The management blade 5 includes: a CPU (e.g. a detection portion and an update portion) 51 that controls the whole management blade; a memory 52 that stores configuration definition information described later and a control program; a power controller 53 that controls ON/OFF of the power supply 6; and a user interface 54. The user interface 54 includes a serial port that connects with the switch blade 3 via a serial cable, and a LAN port that connects with a user PC via a LAN cable.

Figure 5:
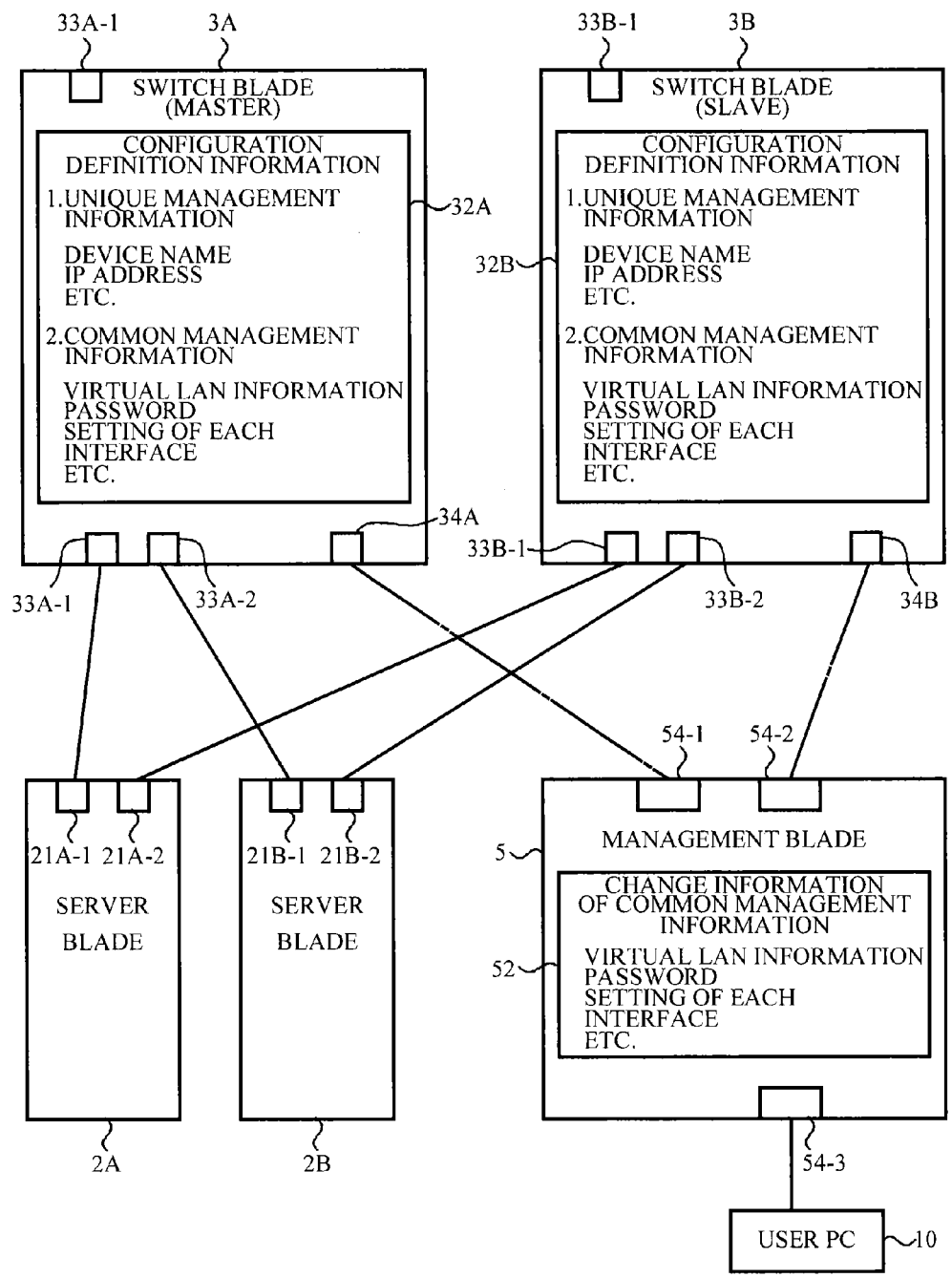
FIG. 5 is a diagram illustrating a connection relationship between a plurality of switch blades, a plurality of server blades, and a management blade.
Figure 6:
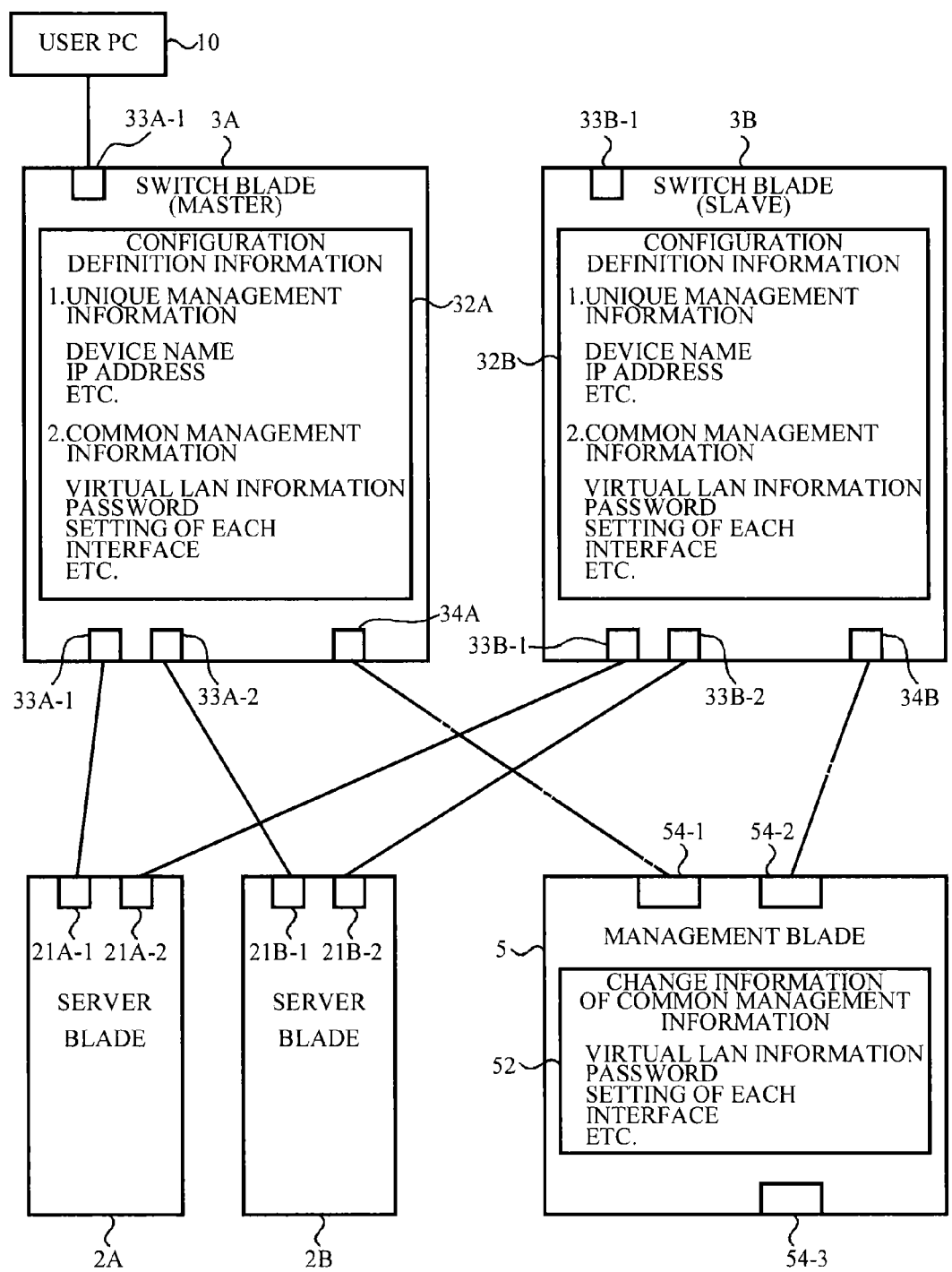
FIG. 6 is a diagram illustrating a connection relationship between a plurality of switch blades, a plurality of server blades, and a management blade.

FIGS. 5 and 6 are diagrams illustrating a connection relationship between the plurality of switch blades 3, the plurality of server blades 2, and the management blade 5. In FIGS. 5 and 6, the plurality of switch blades 3 illustrated in FIG. 3 are switch blades 3A and 3B, and the plurality of server blades 2 are server blades 2A and 2B.

The switch blade 3A includes a memory 32A, a plurality of LAN ports 33A-1 to 33A-3, and a console port 34A. The switch blade 3B includes a memory 32B, a plurality of LAN ports 33B-1 and 33B-2, and a console port 34B. The server blade 2A includes LAN ports 21A-1 and 21A-2. The server blade 2B includes LAN ports 21B-1 to 21B-3. The management blade 5 includes console ports 54-1 to 54-3. In FIGS. 5 and 6, each solid line indicates a LAN cable connecting between the LAN ports, and each chain line indicates a serial cable connecting between the user interfaces. In FIGS. 5 and 6, the user sets the switch blade 3A through a user PC 10 as a master switch blade which mainly works among the redundant configurations, for example, and sets the switch blade 3B through the user PC10 as a slave switch blade which mainly stands by among the redundant configurations, for example. Here, the switch blade 3B may be set as the master switch blade, and the switch blade 3A may be set as the slave switch blade.

Each of the memory 32A of the switch blade 3A and the memory 32B of the switch blade 3B includes unique management information that is unique for each switch blade, and common management information that is common to the switch blades, as the configuration definition information such as a configuration file, as illustrated in FIGS. 5 and 6. There are a device name, an IP (Internet Protocol) address and so on, as the unique management information. There are virtual LAN information, a password, setting of each interface mounted on each switch blade (i.e., setting of each port including the LAN port) and so on, as the common management information. The virtual LAN information is information indicative of a group of a virtual LAN to which each interface (i.e., each port) belongs. When the server blade is added, for example, the setting of the virtual LAN information is performed in order to assign a port connected to the added server blade to an existing group of the virtual LAN or a new group of the virtual LAN. The password is necessary information when the switch blade accesses each server blade. The setting of each interface is information indicative of connection destinations of the LAN ports and the console ports with which the switch blade is equipped.

When the common management information in the configuration file or the like of the switch blade 3A (i.e., the master switch blade) is changed, the memory 52 of the management blade 5 holds the changed contents. The management blade 5 reflects the changed contents in the common management information into the configuration file or the like of the switch blade 3B (i.e., the slave switch blade). In FIG. 5, the user PC10 is connected to the management blade 5 via the serial cable, and hence the user can change the common management information of the switch blade 3A via the management blade 5. In FIG. 6, the user PC 10 is connected to the switch blade 3A via a TELNET protocol, the user can change the common management information of the switch blade 3A. When the user changes the common management information of the switch blade 3B, the user needs to connect the user PC10 to the switch blade 3B via the TELNET protocol. When the user PC 10 accesses the switch blade 3A using a TELNET command, the common management information in the configuration file of the switch blade 3A is displayed on the user PC 10. Similarly, when the user PC 10 accesses the switch blade 3B using the TELNET command, the common management information in the configuration file of the switch blade 3B is displayed on the user PC 10.

In the present embodiment, each of the switch blades 3A and 3B sets a common management information flag (i.e., a common flag) indicating information set common to the switch blades 3A and 3B (i.e., the common management information) and a configuration definition update flag (i.e., an update flag) indicating changed information among a plurality of pieces of information included in the common management information, to the common management information. The management blade 5 monitors the common management information of the switch blade 3A based on the common management information flag of the switch blade 3A. The management blade 5 can identify a monitored object from among the configuration definition information based on the common management information flag. Moreover, the management blade 5 updates the common management information of the switch blade 3B by using the changed common management information of the switch blade 3A, based on the configuration definition update flag of the switch blade 3A.

Hereinafter, the common management information flag and the configuration definition update flag are explained concretely.

Figure 7A:
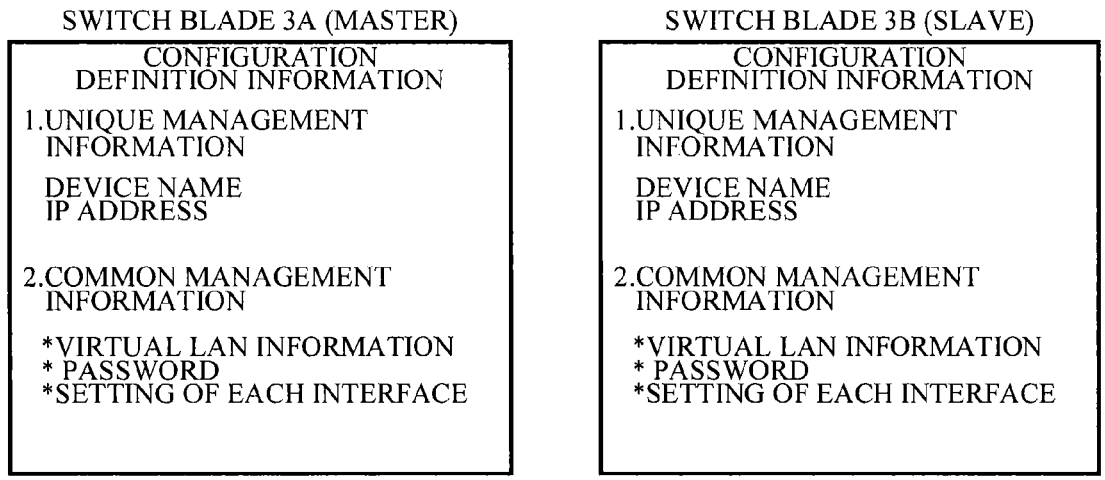
FIGS. 7A to 7C are diagrams illustrating a common management information flag and a configuration definition update flag.
Figure 7B:
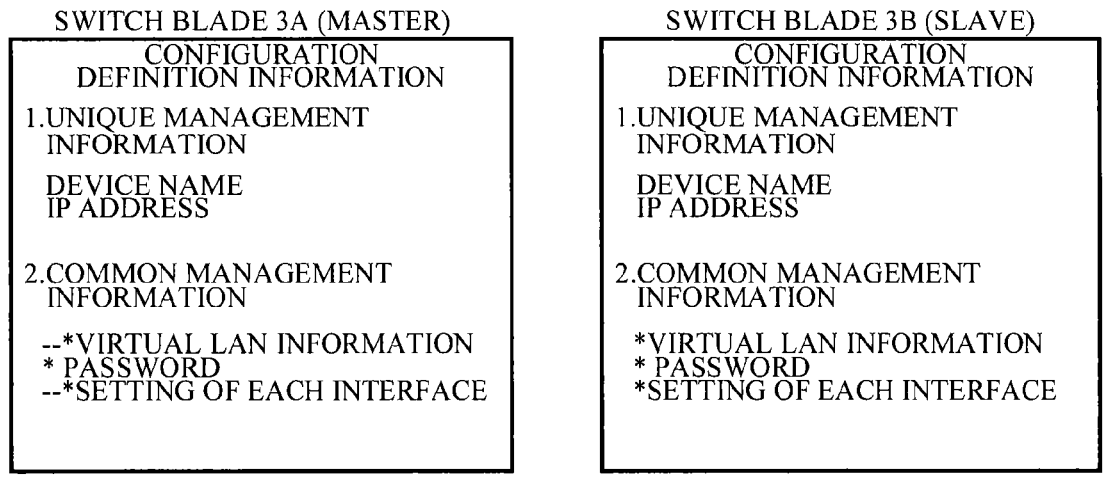

First, each of the switch blades 3A and 3B sets the common management information flag (i.e., "*" of FIG. 7A) to the common management information by writing the common management information flag into the configuration file, as illustrated in FIG. 7A. Next, when the user changes the common management information of the switch blade 3A, the CPU 31 of the switch blade 3A sets the configuration definition update flag (i.e., "--" of FIG. 7B) to a changed part of the common management information by writing the configuration definition update flag into the configuration file, as illustrated in FIG. 7B.

Figure 7C:
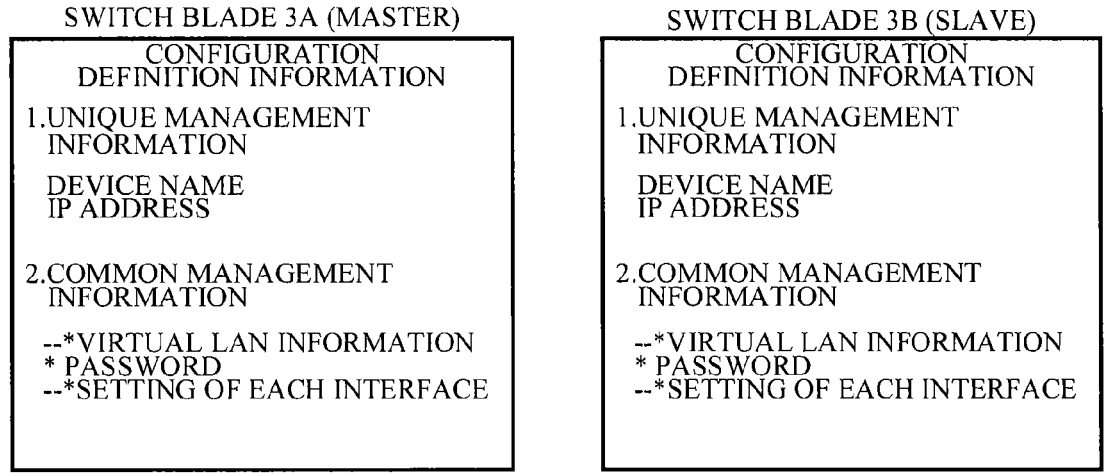

Next, the management blade 5 monitors the configuration definition information of the switch blade 3A at fixed intervals (e.g. every 5 minutes). When the configuration definition update flag is set to the common management information of the switch blade 3A, the CPU 51 stores in the memory 52 information to which the configuration definition update flag is set among the configuration definition information of the switch blade 3A. Moreover, when the configuration definition information of the switch blade 3A is monitored, the CPU 51 updates the common management information of the switch blade 3B by using the changed information of switch blade 3A. FIG. 7C illustrates a state where the common management information of the switch blade 3B has been updated. The monitoring timing of the configuration definition information of the switch blades 3A and 3B is set in advance to the memory 52 of the management blade 5, and can be changed by the user PC 10. Thus, the CPU 51 monitors the existence or nonexistence of the setting of the configuration definition update flag in the configuration definition information of the switch blade 3A at fixed intervals, i.e., for each preset time interval, so that the common management information of the switch blade 3B can be updated for each preset time interval.

Finally, the CPU 51 transmits a change completion command to the switch blade 3A. When the CPU 31 of the switch blade 3A receives the change completion command, the CPU 31 cancels the configuration definition update flag in the configuration definition information. Even after the configuration definition update flag in the configuration definition information is canceled, the CPU 51 periodically monitors the configuration definition information of the switch blade 3A in order to deal with the change of the common management information.

Figure 8:
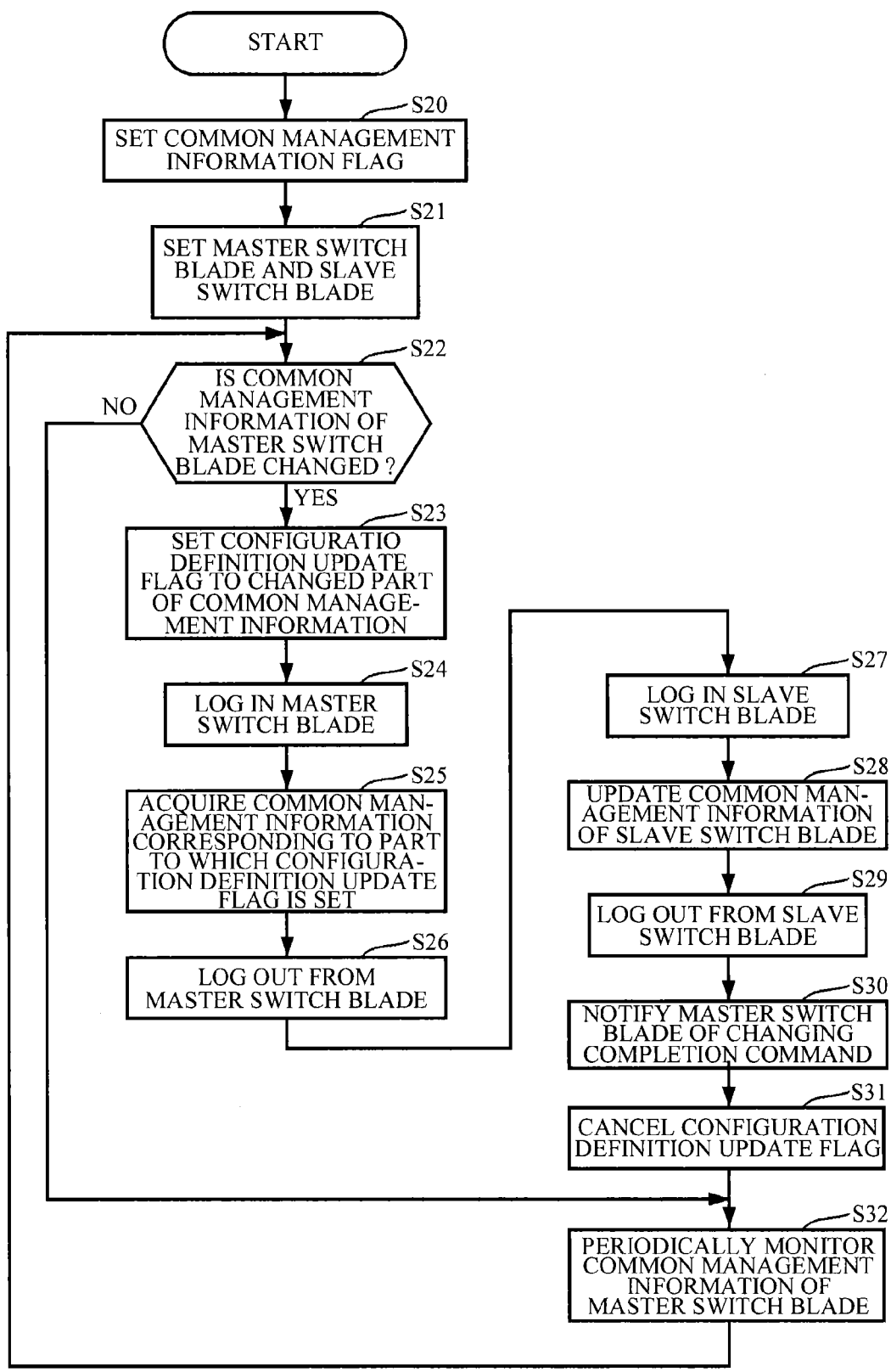
FIG. 8 is a flowchart illustrating an example of the setting and the operation of the blade server.

FIG. 8 is a flowchart illustrating an example of the setting and the operation of the blade server 1.

The CPUs 31 of the switch blades 3A and 3B set the common management information flag to the common management information (step S20). The user sets the master switch blade and the slave switch blade to the switch blades 3A and 3B, respectively (step S21). Here, it is assumed that the switch blade 3A is set to the master switch blade, and the switch blade 3B is set to the slave switch blade.

When the user does not change the common management information in the configuration file of the master switch blade (NO in step S22), a process of step S32 described later is performed. On the contrary, when the user changes the common management information of the master switch blade (YES in step S22), the CPU 31 of the master switch blade sets the configuration definition update flag to a changed part of its own common management information (step S23). The CPU 51 of the management blade 5 logs in the master switch blade (step S24), and acquires the common management information corresponding to a part to which the configuration definition update flag in the configuration definition information is set (step S25). Then, the CPU 51 logs out from the logging-in master switch blade via the TELNET protocol (step S26). The CPU 51 logs in the slave switch blade via the TELNET protocol (step S27), and updates the common management information of the slave switch blade by using the common management information corresponding to the part changed by the master switch blade (step S28). The CPU 51 logs out from the logging-in slave switch blade via the TELNET protocol (step S29), and notifies the master switch blade of a changing completion command (step S30). The CPU 31 of the master switch blade cancels the configuration definition update flag in the configuration definition information (step S31). The CPU 51 periodically monitors the common management information of the master switch blade (step S32). The process returns to step S22.

According to the present process, whenever the common management information of the slave switch blade is updated, the configuration definition update flag in the configuration definition information of the master switch blade is canceled. Therefore, the common management information of the slave switch blade can be updated repeatedly.

Figure 9:
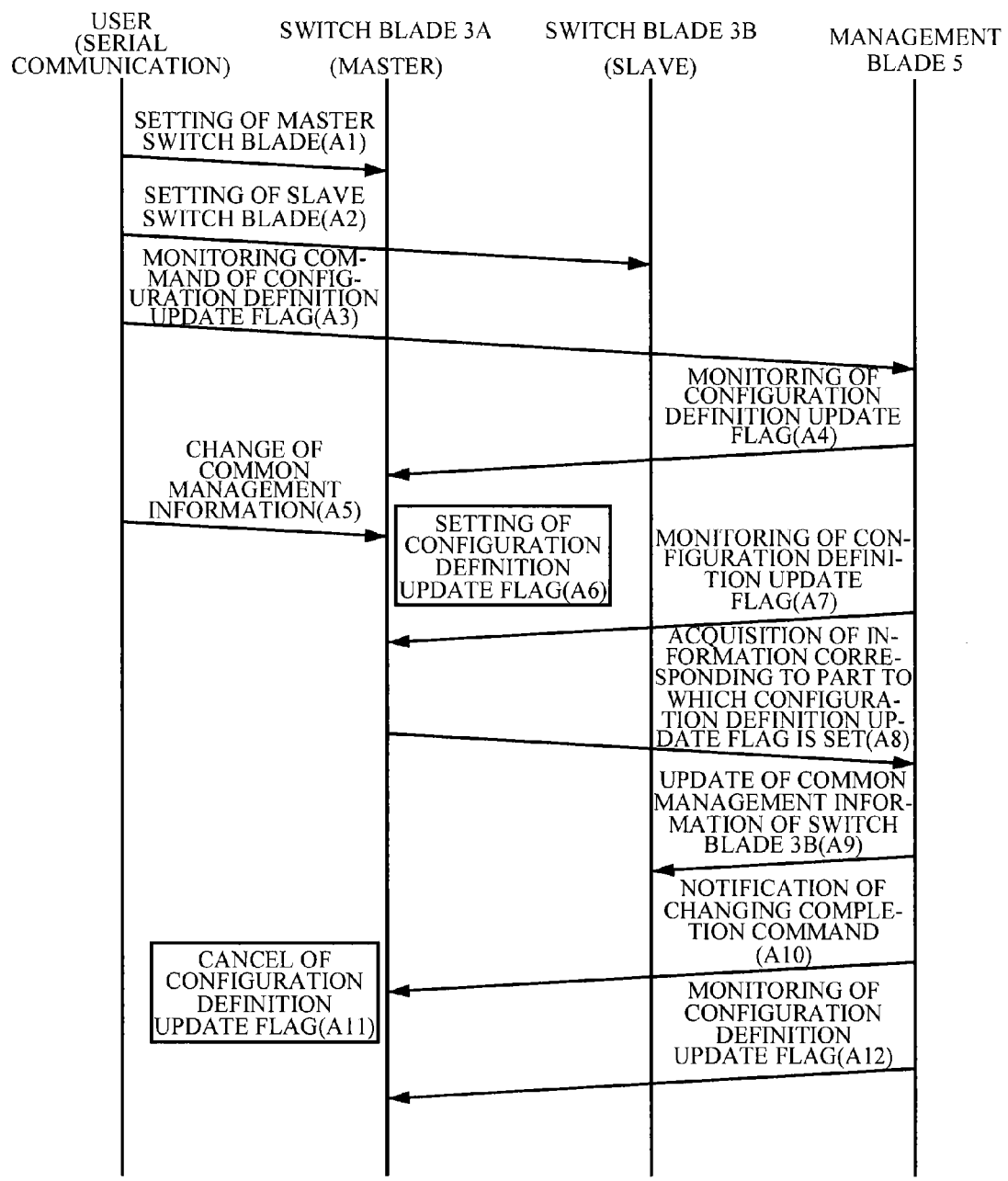
FIG. 9 is a diagram illustrating a process sequence when a user changes common management information of a master switch blade via a console port of a management blade.

FIG. 9 is a diagram illustrating a process sequence when the user changes the common management information of the master switch blade via the console port (i.e., a serial communication) of the management blade.

First, the user sets the switch blade 3A to the master switch blade (A1), and sets the switch blade 3B to the slave switch blade (A2). Next, the user notifies the management blade 5 of a command for monitoring the configuration definition update flag set to the common management information in the configuration file of the switch blade 3A, from the user PC10 (A3). The management blade 5 monitors whether the configuration definition update flag is set to the common management information in the configuration file of the switch blade 3A (A4). When the user changes the common management information of the switch blade 3A (A5), the switch blade 3A sets the configuration definition update flag to the changed part of the common management information (A6).

The management blade 5 monitors whether the configuration definition update flag is set to the common management information in the configuration file of the switch blade 3A (A7). At this time, since the configuration definition update flag is set to the common management information in the configuration file of the switch blade 3A, the management blade 5 acquires the common management information corresponding to a part to which the configuration definition update flag is set (A8). Then, the management blade 5 updates the common management information of the switch blade 3B by using the common management information corresponding to the part changed by the switch blade 3A (A9). Specifically, the management blade 5 overwrites information on the part changed by the switch blade 3A onto corresponding information of the switch blade 3B. Then, the management blade 5 notifies the switch blade 3A of the changing completion command (A10). The switch blade 3A cancels the configuration definition update flag (A11). Then, the management blade 5 periodically monitors the configuration definition update flag in the configuration definition information of the switch blade 3A (A12).

Figure 10:
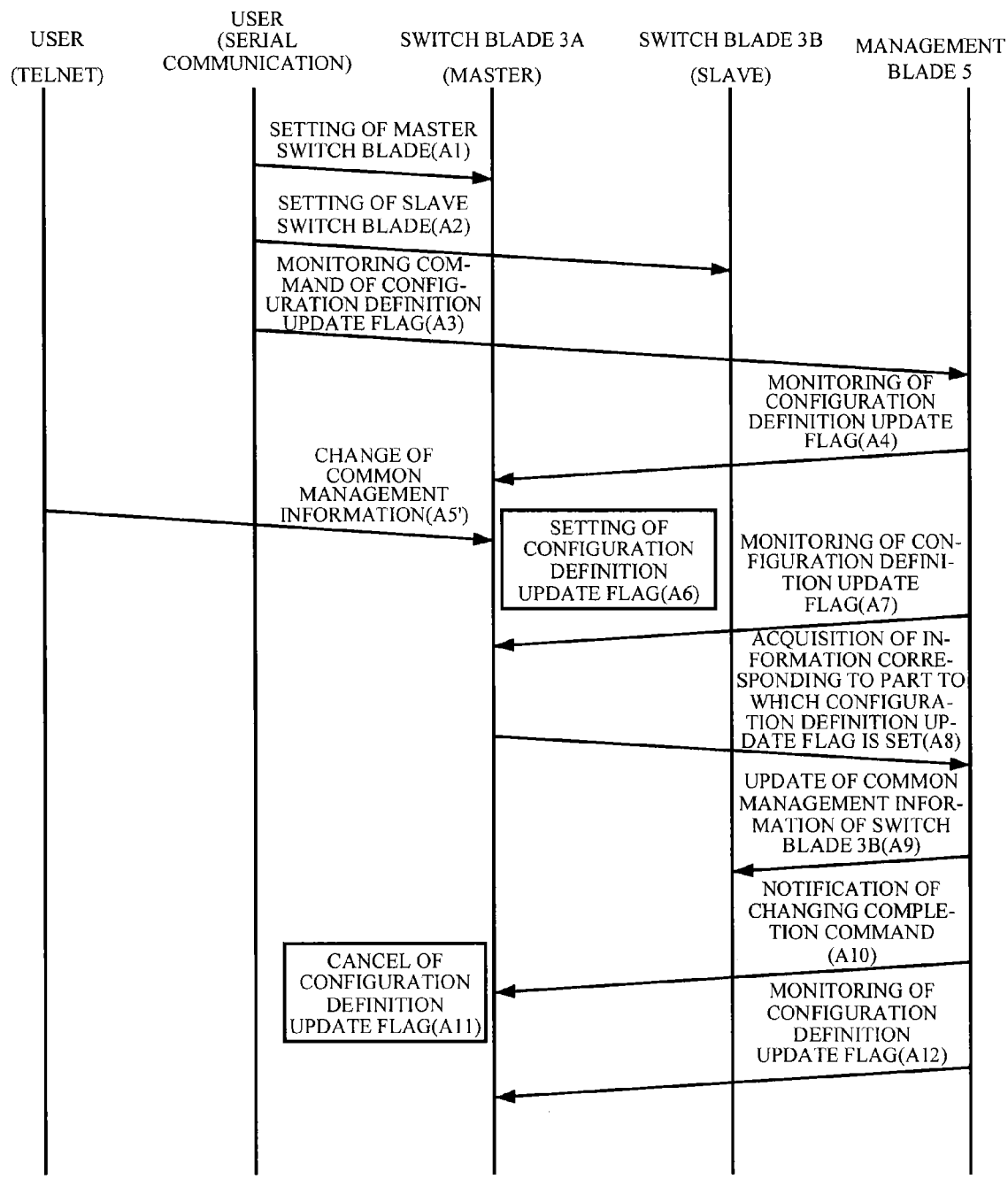
FIG. 10 is a diagram illustrating a process sequence when the user changes common management information of the master switch blade via a TELNET protocol.

FIG. 10 is a diagram illustrating a process sequence when the user changes the common management information of the master switch blade via the TELNET protocol.

The process sequence of FIG. 10 is different form that of FIG. 9 in that the user changes the common management information of the switch blade 3A by using the TELNET protocol (i.e., the LAN port 33A-3 of the switch blade 3A) (A5'). Other elements of the process sequence are the same as those of the process sequence of FIG. 9, and description thereof is omitted.

In the present embodiment, the management blade 5 monitors the change of the common management information in the configuration file of the master switch blade, and updates the common management information of the master switch blade by using the changed part of the common management information. However, regardless of the master switch blade and the slave switch blade, the management blade 5 may monitor the change of the common management information of both switch blades and update a corresponding part of the common management information of another slave switch blade by using the changed part of the common management information of one switch blade. In this case, the user does not need to set the master switch blade and the slave switch blade to the switch blades 3A and 3B, respectively.

As described above, according to the present embodiment, when the common management information set to the configuration file of the switch blade 3A or 3B is changed, the CPU 51 of the management blade 5 detects the change of the common management information based on the configuration definition update flag set to the changed part. Then, the CPU 51 updates the common management information set to the configuration file of the switch blade 3B by using information on the changed part which is included in the switch blade 3A and to which the configuration definition update flag is set. Therefore, the update time of the common management information set to the switch blades 3A and 3B can be shortened. Moreover, since the common management information set to the configuration file of the switch blade 3B is not changed manually, the mistakes of setting change can be reduced. For example, the common management information of another switch blade 3 can be easily reflected to a new switch blade 3 at the time of replacement of the switch blade 3.

Since the common management information flag is set to the common management information included in the configuration definition information, the CPU 51 of the management blade 5 can identify a monitoring object (i.e., common management information) in the configuration definition information. Moreover, since the configuration definition update flag is set to the changed common management information, the CPU 51 of the management blade 5 can easily detect information on the changed part of the common management information.

A non-transitory recording medium on which the software program for realizing the functions of the management blade 5 is recorded may be supplied to the blade server 1, and the CPU 51 may read and execute the program recorded on the non-transitory recording medium. In this manner, the same effects as those of the above-mentioned embodiments can be achieved. The non-transitory recording medium for providing the program may be a CD-ROM (Compact Disk Read Only Memory), a DVD (Digital Versatile Disk), a Blu-ray Disk, SD (Secure Digital) card or the like, for example. Alternatively, the CPU 51 may execute a software program for realizing the functions of the management blade 5, so as to achieve the same effects as those of the above-described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A management device, comprising:
a central processing unit (CPU);
a memory;
at least one interface connected to the CPU wherein setting of each interface is information indicative of connection destinations of local area network (LAN) ports and console ports with which a switch blade is equipped;
a detector that utilizes the CPU to periodically monitor configuration definition information for a common flag of a plurality of switch blades that set the common flag to common information at fixed intervals, and detects information on a changed portion of the common information to which an update flag is set, wherein among the common information to which the common flag is set, each of the plurality of switch blades includes unique information which comprises at least device name and IP address and the common information common to the plurality of switch blades as one information wherein the common information includes virtual LAN information, a password, setting of each interface mounted on each switch blade indicating setting of each local and network port; and
an updater executing on the CPU, updates common information set to another switch blade by using the information on the changed portion of the common information to which the update flag is set, upon detecting the information on the changed portion of the common information, wherein the information on the changed portion being included in one switch blade that is a part of the plurality of switch blades,
wherein the common flag identifying the common information in the plurality of switch blades is configured so that the common information set to the another switching blade is updated in response to the change of the common information in the one switching blade;

wherein the management device notifies one switch blade in the plurality of switch blades of update completion of the common information, and the one switch blade cancels the update flag; and wherein each of the plurality of switch blades change a number and a type of flags to be added to the common information according to a content and a changed state of the common information.

2. The management device as claimed in claim 1, wherein the detector monitors existence or nonexistence of the setting of the update flag at a preset time interval.

3. The management device as claimed in claim 1, wherein each of the switch blades includes an interface connected to an information processor, and the common information includes information indicative of a group of a virtual network to which the interface belongs, a password to be necessary when the switch blade accesses the information processor, and information indicative of a connection destination of the interface.

4. The management device as claimed in claim 1, wherein the switch blades and the management device are provided in an information processing device.

5. The management device as claimed in claim 1, wherein each of the plurality of switch blades sets the common flag and the update flag to the changed portion of the common information, sets the common flag to an unchanged portion of the common information, and sets no flag to the unique information.

6. An information processing device, comprising:
a CPU;
a memory;
at least one interface connected to the CPU wherein setting of each interface is information indicative of connection destinations of LAN ports and console ports with which a switch blade is equipped;
a plurality of switch blades, each of which includes unique information set for each of the plurality of switch blades and common information common to the plurality of switch blades, and a setting portion that sets a common flag to the common information, and when the common information included in the switch blade itself is changed, sets an update flag to a changed portion of the common information; and
a management device including a detection portion that utilizes the CPU to periodically monitor configuration definition information for common flag of a plurality of switch blades which set the common flag to common information at fixed intervals, and detects information on the changed portion of the common information to which the update flag is set, among the common information to which the common flag is set wherein among the common information to which the common flag is set, each of the plurality of switch blades including unique information set for each of the plurality of switch blades wherein the unique information comprise at least device name and IP address and the common information common to the plurality of switch blades as one information wherein the common information include virtual LAN information, a password, setting of each interface mounted on each switch blade indicating setting of each local and network port; and
an update portion executing on the CPU updates common information set to another switch blade by using the information on the changed portion of the common information to which the update flag is set when the detection portion detects the information on the changed portion of the common information, the information on the changed portion being included in one switch blade that is a part of the plurality of switch blades, wherein the common flag is flags identifying the common information in the plurality of switch blades configured so that the common information set to the another switching blade is updated in response to the change of the common information in the one switching blade, and wherein the management device notifies one switch blade in the plurality of switch blades of update completion of the common information, and the one switch blade cancels the update flag;

wherein each of the plurality of switch blades change a number and a type of flags to be added to the common information according to a content and a changed state of the common information.

7. The information processing device as claimed in claim 6, wherein each of the plurality of switch blades sets the common flag and the update flag to the changed portion of the common information, sets the common flag to an unchanged portion of the common information, and sets no flag to the unique information.

8. A control method, comprising:
utilizing a CPU, a memory, and at least one interface connected to the CPU wherein setting of each interface is information indicative of connection destinations of LAN ports and console ports with which a switch blade is equipped;
periodically monitoring at fixed intervals, by a detector that utilizes the CPU, configuration definition information for a common flag of a plurality of switch blades, and detecting information on a changed portion of the common information to which an update flag is set,
updating, by an updater executing on the CPU, common information set to another switch blade by using the information on the changed portion of the common information to which the update flag is set, upon detecting the information on the changed portion of the common information
the method including:
monitoring a common flag of a plurality of switch blades which set the common flag to common information;
detecting information on a changed portion of the common information to which an update flag is set, among the common information to which the common flag is set, each of the plurality of switch blades including unique information set for each of the plurality of switch blades and the common information common to the plurality of switch blades; and
updating common information set to another switch blade by using the information on the changed portion of the common information to which the update flag is set when the information on the changed portion of the common information is detected, the information on the changed portion being included in one switch blade that is a part of the plurality of switch blades,
wherein the common flag identifying the common information in the plurality of switch blades configured so that the common information set to the another switching blade is updated in response to the change of the common information in the one switching blade wherein among the common information to which the common flag is set, each of the plurality of switch blades including unique information set for each of the plurality of switch blades wherein the unique information comprise at least device name and IP address and the common information common to the plurality of switch blades as one information wherein the common information include virtual LAN information, a password, setting of each interface mounted on each switch blade indicating setting of each local and network the port;

wherein the management device notifies one switch blade in the plurality of switch blades of update completion of the common information, and the one switch blade cancels the update flag;

wherein each of the plurality of switch blades change a number and a type of flags to be added to the common information according to a content and a changed state of the common information.

9. The control method as claimed in claim 8, wherein each of the plurality of switch blades sets the common flag and the update flag to the changed portion of the common information, sets the common flag to an unchanged portion of the common information, and sets no flag to the unique information.

* * * * *